United States Patent
Day et al.

[15] 3,692,318
[45] Sept. 19, 1972

[54] DUAL-LIP SHAFT SEAL WITH SPRING URGED AUXILIARY LIP

[72] Inventors: Frank A. Day, Farmington; James A. Repella, Madison Heights, both of Mich.

[73] Assignee: Federal-Mogul Corporation, Detroit, Mich.

[22] Filed: May 3, 1971

[21] Appl. No.: 139,719

[52] U.S. Cl. ..........................277/164, 277/DIG. 4
[51] Int. Cl. .................................................F16j 15/32
[58] Field of Search.....................277/237 A, 134, 138, 164, 38–43

[56] References Cited

UNITED STATES PATENTS 3,561,770   2/1971   Corsi.................277/164

FOREIGN PATENTS OR APPLICATIONS 580,871   9/1946   Great Britain............277/164
1,461,372   11/1966   France......................277/164

*Primary Examiner*—William F. O'Dea
*Assistant Examiner*—Robert I. Smith
*Attorney*—Owen, Wickersham & Erickson

[57] ABSTRACT

A dual-lip radial shaft seal having a primary oil-sealing lip urged against the shaft by a free garter spring and provided with a novel auxiliary dust-sealing lip spaced from the primary lip and serving to exclude dust. This auxiliary lip is urged into engagement with the shaft by a garter spring stretched from its rest position and incorporated into the lip itself so that it lies tangent to the opposite sides of the auxiliary lip. This stretched garter spring in the auxiliary lip makes it possible to obtain better dirt exclusion at a location where it would be substantially impossible to provide an exposed garter spring and where such a garter spring, if used, would corrode unless made of expensive noncorrodible material.

5 Claims, 3 Drawing Figures

PATENTED SEP 19 1972 3,692,318
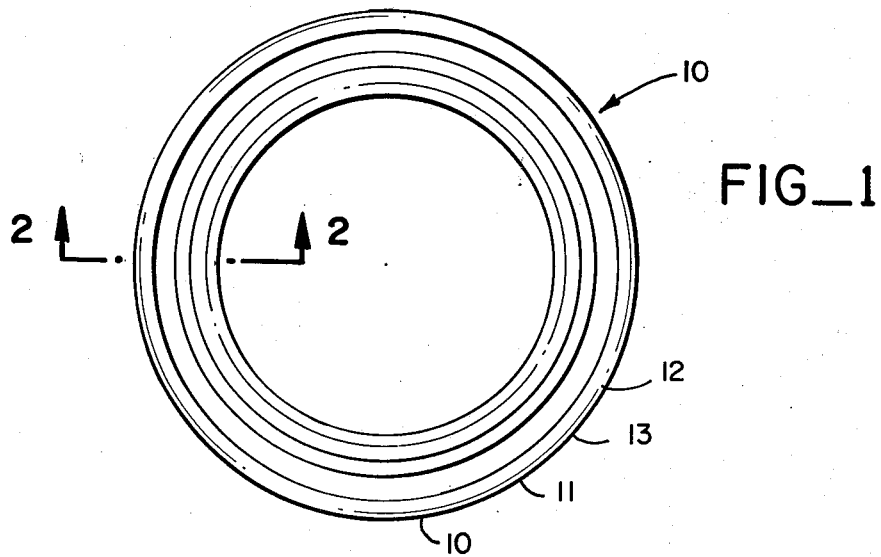
FIG_1
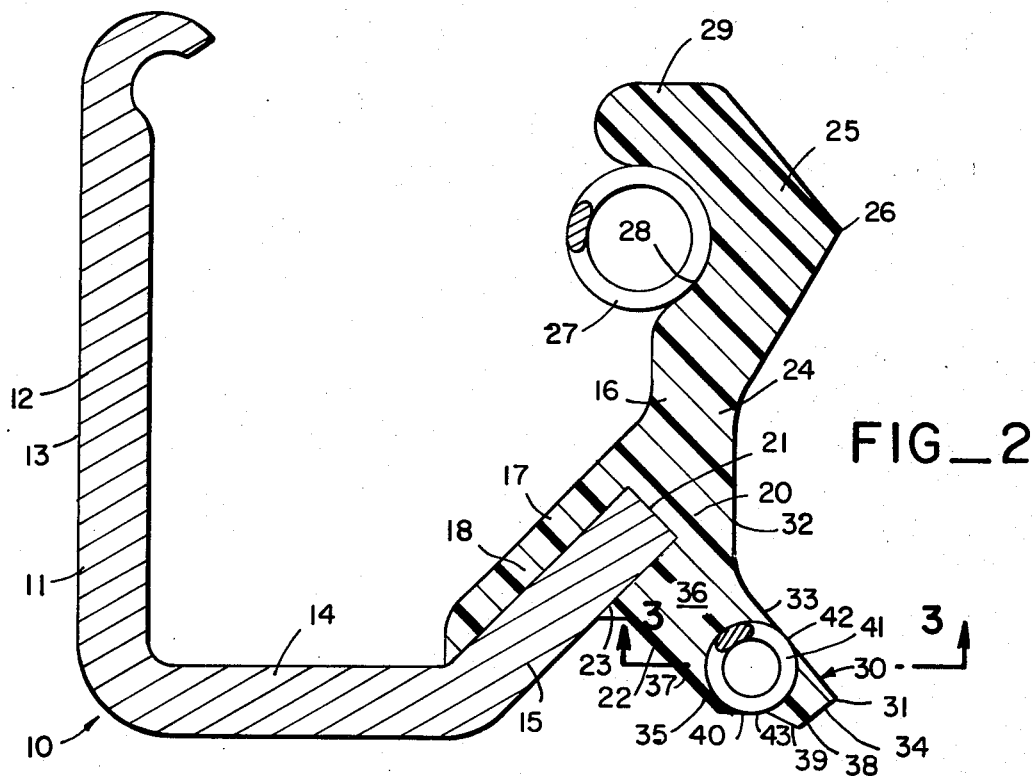
FIG_2
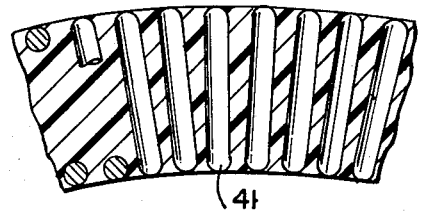
FIG_3
INVENTOR.
FRANK A. DAY
JAMES A. REPELLA
BY
Owen, Wickersham & Erickson
ATTORNEYS

DUAL-LIP SHAFT SEAL WITH SPRING URGED AUXILIARY LIP

BACKGROUND OF THE INVENTION

This invention relates to a radial type of shaft seal of the type having two lips of molded elastomer, both integral with an elastomeric body portion and supported by a rigid case.

Dual-lip shaft seals of this type are best exemplified by U. S. Pat. No. 3,010,748, and such seals have achieved excellent results. Two lips are molded simultaneously while being bonded to the tip of a radially extending metal flange. One lip is a primary lip for retaining the oil; this primary lip has in most cases been urged against the shaft by a garter spring. The structure of the primary lip and the use of the garter spring with it are not changed by the present invention, but they are part of the structure and are very desirable. The present invention relates especially to the second lip, which is used to seal out dust.

Heretofore dust-sealing lips have not, in contrast with primary lips, had any spring to urge them against the shaft. For one thing, in many installations there has not been sufficient space in such seals and installations to provide the dust lip with a garter-spring retaining groove like that of the primary lip, for the dust-sealing lip is often made to lie within or at least close to the radial plane defined by the supporting case. Thus the case, or metal reinforcing member to which the elastomeric body is bonded, has a radially extending flange with an angular anchor portion at its inner extremity inclining towards the opposite end of the seal and towards the primary lip. The dust-sealing lip extends in the opposite direction from this anchor portion, and it is intended, in many instances, to lie within or close to the space taken up by the seal case, so that the presence of this second lip creates no additional space problem. This very desirable feature is retained in this invention, although it has made impossible use of a free garter spring openly retained by a groove in the auxiliary lip.

Another disadvantage with having a spring at the dust-sealing lip has been that an exposed spring, i.e., a spring like the garter spring normally used with the main lip, would rapidly become inoperative, due to dirt packing in between its coils. The reason for this is that the auxiliary lip is exposed to dirt, whereas the main sealing lip is protected from dirt. Thus, even if there were space for such a garter spring on the auxiliary lip, the garter spring could not be satisfactorily used if it had to be so exposed. Also, such an exposed garter spring would corrode rapidly unless made from stainless steel or other expensive corrosion-resistant metal.

A BRIEF SUMMARY OF THE INVENTION

The present invention incorporates an integrally molded dual-lip shaft seal having a metal case, preferably with a radial flange having an angularly extending terminal portion to which is bonded an elastomeric seal body providing both lips. The primary lip may be provided with an annular groove for receiving a garter spring that is installed after molding, or it may be provided with a molded-in spring, if desired. In the present invention, the secondary lip, which is used for dust sealing, is always provided with an integrally molded-in and somewhat stretched garter spring which lies in the auxiliary lip close to its actual contact edge and is itself tangent to two opposite walls of the lip. As a result, its position is completely determined, and its action is uniform.

The bonded-in spring is not subject to dirt-packing or corrosion and does not increase the axial dimension of the seal unit. The dirt-sealing lip with its spring still lies within the volume defined by the case of the seal.

Other objects and advantages of the invention will appear from the following description of a preferred embodiment.

BRIEF DESCRIPTION OF THE DRAWINGS

In the drawings:

FIG. 1 is an end view of a complete seal embodying the principles of the invention.

FIG. 2 is an enlarged view in section taken along the line 2—2 in FIG. 1.

FIG. 3 is a further enlarged fragmentary view taken along the line 3—3 in FIG. 2.

DESCRIPTION OF A PREFERRED EMBODIMENT

A seal 10 embodying the principles of the invention is a complete annulus, and is of the integrally molded dual-lip type. The seal 10 has a case or metal reinforcing member 11, generally made from sheet steel. The case 11 is provided with a cylindrical portion 12 having a bore engaging surface 13 and a radially extending flange 14 having an inner angularly directed anchor portion 15 in accordance with the invention of U. S. Pat. No. 3,004,298.

An elastomeric body 16 is molded and bonded to the angularly extending portion 15 having a main anchor portion 17 bonded to the axially inner surface 18 of the portion 15, a portion 20 encircling the annularly extending edge 21 of the flange 14, and another anchor portion 22 covering about half of the outer surface 23 of the portion 15. The body 16 has a main body portion 24 on the axially inner side of the flange 14 and anchor portion 15, and beyond it is a main lip body 25 having a sealing lip edge 26 and a spring-receiving groove 27 to receive, after molding, an exposed garter spring 28. The lip body 25 also has a retainer portion 29 for aiding in retention of the garter springs. However, if desired a spring may be molded into the lip body 25, and then the structure at that location would be somewhat different than shown here.

On the axially outer side of the reinforcing member's flange portion 15 is a dust-sealing lip 30 having a sealing edge 31. It is integral with the lip 25 and body portion 24 and is connected to them by a generally cylindrical portion 32. It extends inwardly from and generally perpendicularly to the portion 15. The lips 25 and 30 will flex individually, so that one is not substantially influenced by the other under normal conditions.

The auxiliary sealing lip 30 has an inner frustoconically shaped surface 33 extending from the cylindrical portion 32 to the dust-sealing lip edge 31. The opposite face of the lip 31 is a converging frustoconical portion 34 which is relatively short and leads to the opposite face 35 of the dust-sealing lip 30. This opposite face 35, in the preferred structure, is stepped to provide a wider lip portion 36 bounded by a frustoconical surface 37 adjacent to the anchor portion and a narrower portion 38 adjacent to the lip edge 31 and having a frustoconical surface 39, the surfaces 37 and 39 being joined by a radial cylindrical portion 40.

In the lip 30 is a garter spring 41 which is not in its rest position but is held somewhat stretched out or tensed at all times by being molded while held that way, slightly enlarged, and by being retained thereafter in this somewhat stretched position by the elastomer of the lip 30. The spring 41 has one line of tangency 42 that is tangent to and substantially continuous with the face 33, very little, if any of it being exposed there. Usually it is covered with a very thin film of elastomer which helps to protect the spring 41 from corrosion. Even if the film is not present, corrosion is not much of a problem because the area exposed is so small. Similarly, another portion 43 lies tangent to the radial cylindrical surface 40 just slightly above the corner where the surface 40 meets the surface 39.

The actual auxiliary sealing lip thus lies to one side of the spring 41, and the lip's supporting portion 36 lies to the other side of the spring 41 and both cooperate to encase the spring 41 fully. Elastomer fills the spring 41 inside and between coils, as shown in FIG. 3. The spring 41 lies closely adjacent to the lip 31, and, though not quite directly above it, is close enough to it so that its urging action is quite efficient. The spring 41 lies somewhat axially inwardly from the lip 31 and tends to bring the lip 31 down against the shaft in a most desirable way for excluding dirt.

Being so located, the spring 41 forms in itself part of the dust-sealing lip 30. The entire dust-sealing lip 30, including the spring 41, lies within the area defined by the seal case 11, rather than extending axially outside it, which would be undesirable, especially where there are space limitations. Also, the spring 41 is protected from dirt, water, and other elements that tend to attack a dust-sealing lip.

In operation, the garter spring 27 keeps the main sealing lip 26 snugly against the shaft in proper sealing relation, while the garter spring 41, which is incorporated into the auxiliary lip 30, keeps the auxiliary lip edge 31 snugly against the shaft in proper dust-sealing relationship.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An integrally molded dual-lip radial shaft seal having spring-urged contact for both lips, including in combination:

a rigid metal annular case having a radially extending flange terminating in an angular axially in-turned portion, and an elastomeric sealing member bonded to both sides and the edge of said angular portion and having on one side of said angular portion a main sealing lip and on the other side of the angular portion an auxiliary sealing lip having a lip edge and opposite walls, said auxiliary sealing lip having molded therein a garter spring that is somewhat stretched and tends to urge said lip radially inward, said spring being tangent to both of said opposite walls.

2. A dual-lip shaft seal of the integral molded type, including in combination:

a rigid reinforcing member having a cylindrical bore-engaging portion and a radially inwardly extending flange terminating in an axially inwardly angularly extending portion, and an elastomeric sealing member bonded to said angularly extending portion of both sides thereof and on the edge thereof, said sealing member having a main oil-retaining seal lip lying to the axially inner side of the angularly extending portion, a secondary dust-sealing lip on the other side of said angularly extending portion and generally perpendicular to it, and having a sealing edge, said dust-sealing lip being defined by two opposite walls and having embedded therein a garter spring, partially extended and stretched, and tangent to each of said two opposite walls, and spaced radially outwardly from and axially inwardly away from said sealing edge between that edge and the angularly extending portion.

3. The seal of claim 2 wherein said dust-sealing lip has an inner frustoconical portion meeting an outer oppositely inclined frustoconical portion at said edge and, on the opposite side of said lip from said inner frustoconical portion, a stepped surface having a wider portion adjacent to said angularly extending portion and a narrower portion adjacent to said edge, said stepped surface comprising two frustoconical portions joined by a radial cylindrical portion, said embedded spring being tangent to said cylindrical portion and to said inner frustonical portion.

4. The seal of claim 2 wherein said sealing member is provided with a groove opposite said main oil-retaining lip, for retaining a garter spring in a desired position for exerting radially inward pressure on said lip, and a garter spring in said groove.

5. The seal of claim 2 wherein said elastomeric sealing member lies wholly within the volume defined by said rigid reinforcing member, so that it does not extend axially beyond the rigid reinforcing member in either direction.

* * * * *